United States Patent
Lategan et al.

(10) Patent No.: US 9,667,649 B1
(45) Date of Patent: May 30, 2017

(54) DETECTING MAN-IN-THE-MIDDLE AND DENIAL-OF-SERVICE ATTACKS

(71) Applicant: Amazon Technologies, Inc., Seattle, WA (US)

(72) Inventors: Frans Adriaan Lategan, Johannesburg (ZA); Andries Petrus Johannes Dippenaar, Cape Town (ZA); Marcin Piotr Kowalski, Cape Town (ZA); Gina Louise Morris, Cape Town (ZA); Anton Andre Eicher, Hout Bay (ZA); Duncan Matthew Clough, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 329 days.

(21) Appl. No.: 13/865,782

(22) Filed: Apr. 18, 2013

(51) Int. Cl.
*H04L 29/06* (2006.01)

(52) U.S. Cl.
CPC .......... *H04L 63/1458* (2013.01); *H04L 63/12* (2013.01); *H04L 63/123* (2013.01)

(58) Field of Classification Search
CPC ... H04L 63/12; H04L 63/123; H04L 63/1408; H04L 63/1425; H04L 63/1458; H04L 63/1475; H04L 63/1466
USPC .................................................... 726/22–25
See application file for complete search history.

(56) References Cited

U.S. PATENT DOCUMENTS

| | | | |
|---|---|---|---|
| 6,718,361 B1* | 4/2004 | Basani et al. ................. | 709/201 |
| 2003/0023880 A1* | 1/2003 | Edwards et al. .............. | 713/201 |
| 2003/0204769 A1* | 10/2003 | Coughlin ................ | H04L 69/40 |
| | | | 714/4.12 |
| 2005/0166041 A1* | 7/2005 | Brown .......................... | 713/150 |
| 2007/0050841 A1* | 3/2007 | Loen ................................ | 726/7 |
| 2009/0132649 A1* | 5/2009 | Hubbard ....................... | 709/203 |
| 2009/0222818 A1* | 9/2009 | Valentin ........................ | 718/100 |
| 2011/0145406 A1* | 6/2011 | Ze et al. ....................... | 709/224 |
| 2012/0023577 A1* | 1/2012 | Stephens, Jr. .................. | 726/22 |

* cited by examiner

Primary Examiner — Benjamin Lanier
(74) Attorney, Agent, or Firm — Lee & Hayes, PLLC

(57) ABSTRACT

Attacks, such as MITM and DoS attacks, on a distributed computing system may be detected by sending a work assignment to an execution device through a first communication channel. A report may then be received through a second communication channel of the work assignment received by the execution device. Information regarding the received work assignment may then be in view of information regarding the sent work assignment to determine whether an error, such as an MITM or DoS attack, has occurred. If the analysis indicates that the report does not include the sent work assignment, then a DoS attack may have occurred. If the analysis indicates that the work assignment received by the recipient does not correspond to the sent work assignment, then a MITM attack may have occurred. If an error has occurred, an indication might be recorded and/or other types of actions might also be taken.

26 Claims, 5 Drawing Sheets

DETECTING MAN-IN-THE-MIDDLE AND DENIAL-OF-SERVICE ATTACKS

BACKGROUND

In certain distributed computing systems, a work manager computing system receives work assignments from client devices and assigns and distributes the work via one or more intermediaries to recipients that perform the work. The work assignments are typically sent over a network, which may be a private network or an open or public network, such as but not limited to the Internet. The results of the work assignment may be sent, if appropriate, from the recipient to the work manager computing system over the network, again via one or more intermediaries.

A problem may occur if a work assignment is somehow altered before it reaches the recipient and/or the work results (the results of executing the work assignment) are altered after they are returned by the recipient. A work assignment may be altered accidentally due a hardware error, a software error, or another type of error, or may be intentionally altered, such as when an intermediary has become corrupted by malware, such as but not limited to a virus, or when an intermediary has obtained credentials that allow it to pose as an intermediary or as a recipient. Intentional tampering of this sort is often referred to as a "man-in-the-middle" ("MITM") attack.

A problem might also occur if an intermediary acknowledges the work assignment but does not forward the work assignment to the recipient, or does not return, if appropriate, the work result from the recipient. This may happen accidentally due to a hardware error, a software error, or another type of error, or may be intentional, such as the result of a "denial-of-service" ("DoS") attack. MITM, DoS, and other types of attacks are often hard to detect, especially if the expected result expected does not need to contain proof of work, or if the work expected will take a substantial amount of time to perform. It is also often difficult to identify the intermediary or recipient that is the location of the problem.

It is with respect to these and other considerations that the disclosure presented herein has been made.

DETAILED DESCRIPTION

Figure 1:
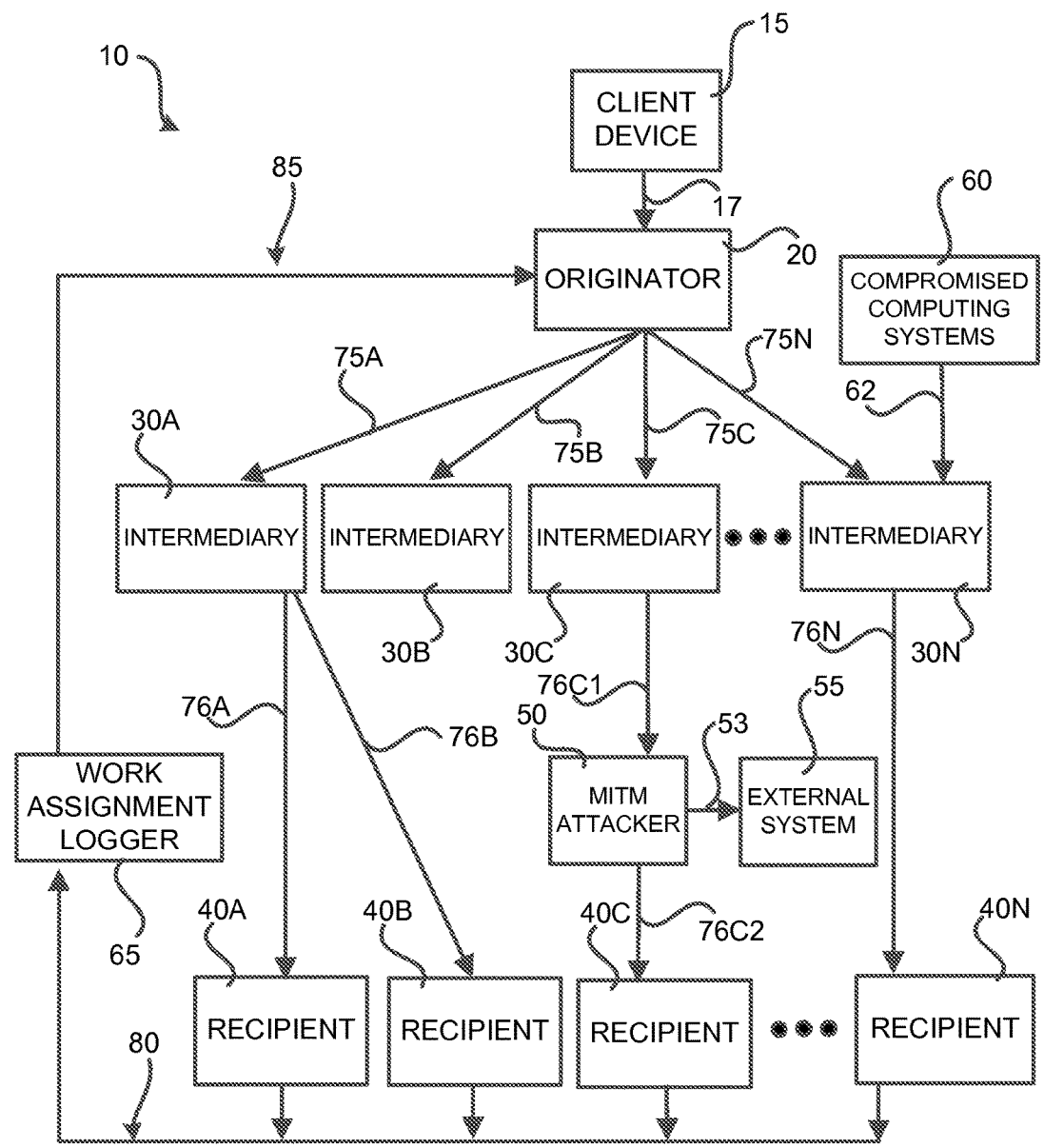
FIG. 1 is an illustration of an exemplary distributed computing system that can detect MITM and/or DoS attacks, according to one embodiment disclosed herein.

The following detailed description is directed to concepts and technologies for detecting attacks, such as MITM and DoS attacks, directed to, for example, but not limited to, distributed computing systems. In some embodiments, attacks may be detected by sending a work assignment to an execution device through a first communication channel. A report may then be received through a second communication channel of the work assignment received by the execution device. Information regarding in the report regarding the received work assignment may then be analyzed in view of information in the sent work assignment to determine whether an error, such as an MITM or DoS attack, has occurred. If the analysis indicates that the report does not include the sent work assignment, then a DoS attack may have occurred. If the analysis indicates that the work assignment received by the recipient does not correspond to the sent work assignment, then a MITM attack may have occurred. If an error has occurred, an indication might be recorded and/or other types of actions might also be taken. Additional details regarding these and other aspects of the embodiments presented herein will be described below.

Thus, briefly stated, in a distributed computing system having an originator which distributes and sends out work, numerous intermediaries which further distribute the work, and numerous recipients which perform the work, the originator sends work assignments to the intermediaries. Each intermediary, in turn, distributes its work assignments among its respective recipients and sends the work assignments to the recipients. Each recipient reports the work assignment that it has received to a logger which prepares a work assignment report based on information on the work assignments that it received from the various recipients. The work assignment report is analyzed by the originator, or possibly by the logger or another device, in view of the work assignments that the originator sent to the intermediaries. Any differences may be considered to be errors, such as MITM or DoS attacks, and any errors can then be acted on and/or reported for action.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types.

In the following detailed description, references are made to the accompanying drawings that form a part hereof, and in which are shown by way of illustration specific embodiments or examples. Referring now to the drawings, in which like numerals represent like elements throughout the several figures, aspects of a mechanism for detecting attacks, such as MITM and DoS attacks, will be presented.

FIG. 1 is an illustration of an exemplary distributed computing system that can detect certain types of attacks, such as MITM and DoS attacks. In one embodiment, the exemplary distributed computing system 10 includes one or more client device devices 15, an originator 20, a number of intermediaries 30A-30N, a number of recipients 40A-40N, at least one work assignment logger 65, and a network that includes various communication channels, or communication links, which connect the various components 15, 20, 30, 40, 50, 60, 65. Communication channels or communication links are collectively referred to as "communication channels" herein, such as but not limited to the communication channels 17, 53, 62, 75, 76A, 76B . . . 76N (collectively, or singly, as the context may require, channel 76), 80, and 85.

A communication channel may be a physical channel, a logical channel, or a combination or combinations thereof.

In some embodiments, the originator 20 is a work manager computing system that receives work assignments, which may also be known as service orders, work requests, work orders, or service requests, from one or more client device devices 15 that are connected via one or more communication channels 17 in the network. The originator 20 assigns and distributes the work assignments to various distributed computing systems that perform the work.

Typically, the originator 20 assigns work assignments to intermediaries 30 which may, but typically do not, perform the actual work assignments. An intermediary 30 is a work transfer device or a workflow server which assigns (allocates) its respective work assignments (workflows) to its respective recipients 40, and then sends (transfers) the work assignments to those respective recipients 40 for execution. The recipients 40 are computing systems configured to actually perform the work described by the work assignments. A recipient 40 may be a single computing device which executes a single application, or only executes one instance of an application but may execute multiple, different applications. A recipient 40 may also be an application on a computing device which is executing numerous instances of one or more applications, each instance being considered to be a separate recipient. The work assignments to the recipient and the work results from the recipient are typically sent over the network between the originator 20 and the intermediaries 30, and between the intermediaries 30 and the recipients 40.

In the case when there is neither a MITM attack nor a DoS attack, the originator 20, which may also be known as a work manager computing system, receives a work assignment from a client device 15. The work assignment may be, for example, but not limited to, a request to store data, retrieve data, perform a calculation, or perform another type of processing. The result of the performance of the work assignment may or may not be reported back to the originator 20, or may or may not be forwarded to a client device 15 or to another device or system.

The originator 20 forwards the work assignment to an intermediary 30 over the network. The intermediary 30 may be selected based upon the balance of the current workload among the intermediaries 30, the type of work to be performed, the resources available to a particular intermediary 30, the speed of response desired, and/or one or more other factors. In some cases, the work assignment may be spread among several intermediaries 30, which may then spread their respective assigned workloads among their several respective recipients 40. An intermediary 30, for example intermediary 30A, forwards a work assignment to a recipient 40A or 40B that actually performs the requested work. The particular recipient 40 may be selected based upon the balance of the current workload among the recipients of that intermediary 30, the type of work to be performed, the resources available to a particular recipient, the speed of response desired, and/or one or more other factors. For example, the intermediary 30A may forward one work assignment to recipient 40A and another work assignment to recipient 40B. The recipient, 40A for example, performs the work assignment and, typically, reports the receipt of the work assignment and/or the completion of the work assignment and/or the results of the work assignment to the originator 20 through the assigning intermediary 30A.

For convenience of illustration, only four intermediaries 30A-30N are shown connected to the originator 20. In practice, however, the originator 20 will connect with many intermediaries 30, perhaps even hundreds of intermediaries 30. Also for convenience of illustration, only two recipients 40A and 40B are shown for intermediary 30A, no recipients are shown for intermediary 30B, only one recipient 40C is shown for intermediary 30C, and only one recipient 40N is shown for intermediary 30N. In practice, however, each intermediary 30 will have hundreds to thousands of recipients 40.

As mentioned briefly above, a MITM attack is a type of computer security breach in which an attacker makes independent connections with two victims and relays messages between them. The attacker in an MITM attack makes it appear to the victims of the attack that they are communicating directly with one another over a private connection. The attacker, however, controls the entire conversation.

In a transaction between an intermediary 30 and a recipient 40, for example, an MITM attacker 50 can utilize various techniques to split a single connection between an intermediary 30 and a recipient 40 into two separate connections: one connection between the intermediary 30 and the attacker 50, and another connection between the attacker 50 and the recipient 40. For instance, in the example shown in FIG. 1, the attacker 50 has interposed itself between intermediary 30C and recipient 40C. Once the connection has been split in this manner, the MITM attacker 50 can read and modify data transmitted between the originator 20 and intermediary 30C one on side, and the recipient 40C on the other side, without being easily detected. In this way, the MITM attacker 50 can make it appear to the victims of the attack that they are communicating directly with one another over a private connection but the MITM attacker 50 may actually control all communications between them.

In the example shown in FIG. 1, the MITM attacker 50 has compromised a transaction between an intermediary computing system 30C and a recipient computing system 40C. In this example, the MITM attacker 50 has utilized one of many techniques known in the art to split a single connection between the intermediary 30C and the recipient 40C into two separate connections: one connection 76C1 between the intermediary 30C and the MITM attacker 50, and another connection 76C2 between the attacker 50 and the recipient 40C.

Once the connection has been split in this manner, the MITM attacker 50 can read and modify data transmitted between the originator 20 and the recipient 40C without being easily detected. In the example shown in FIG. 1, the MITM attacker 50 masquerades as the intermediary 30C when communicating with the recipient 40C and masquerades as the recipient 40C when communicating with the intermediary 30C. The originator 20 and the intermediary 30C, on the one side, and the recipient 40C, on the other side, believe that they are in direct communication with each other while in fact the MITM attacker 50 is controlling the conversation. In one type of MITM attack, the Network Interface Card (NIC) (not shown) in a device is targeted and the programming therein is changed to further the result desired by the attacking party.

It should be appreciated that the MITM attack discussed above is merely illustrative, and that an MITM attacker 50 might also perpetrate other types of MITM attacks of greater sophistication. These types of attacks are well known to those skilled in the art. Also, although the MITM attack shown in FIG. 1 and described above is illustrated as being between an intermediary 30 and a recipient 40, this type of attack might be perpetrated at any point between any two computing systems.

Consider now the situation where an MITM attack has occurred. The attack may be in the form of a compromised intermediary 30, or a compromised server or relay in the communication path between the intermediary 30 and the recipient 40. In this example, a client device 15 may request work and, in response thereto, the originator 20 may send a work assignment corresponding to the work to an intermediary 30, 30C for example. The intermediary 30C, in turn, attempts to forward the work assignment to the recipient 40C.

In the example shown in FIG. 1, however, the MITM attacker 50 may intercept the work assignment. The MITM attacker 50 may then alter the work assignment in some manner, such as by requesting more data than originally requested by the client device, different data, writing or erasing data, etc. The MITM attacker 50 may then provide the altered request to the recipient 40C. Because the work assignment appears to validly come from the intermediary 30C, the recipient 40C then performs the altered work assignment and, in this example, sends the results of the work assignment back to the intermediary 30C. The MITM attacker 50 may then forward the data to an external system 55. The MITM attacker 50 might also modify the data and send the intermediary 30C the modified data, which then is, or appears to be, the requested data. The intermediary 30C may then forward this data to the originator 20. As the data is, or appears to be, the requested data, the originator 20 and intermediary 30C have no immediate knowledge of the MITM attack.

More specifically, such MITM are greatly simplified in certain workloads where the only response an intermediary 30C expects from a recipient 40C is an acknowledgement that the work has been done (OK), obviating the MITM attacker from changing both the request and the response. Changing only the request or the response but not both could still be considered a successful attack.

The specific attack mentioned above is significant in cases where signatures or other mechanisms could protect the request or the response, preventing one or the other (but not both) from being changed.

A DoS attack is another type of network-based attack. One common method for performing a DoS attack involves saturating a target computing device, such as the intermediary 30N, with a volume of requests that cause the intermediary 30N to respond so slowly as to appear to be unavailable, or to be unable to respond at all. As a result, the target computing device cannot respond to a legitimate request. For example, a DoS attack might cause the intermediary 30N to reboot, or may consume so many of the resources of the intermediary 30N that it can no longer perform its intended role as an intermediary between the originator 20 and its recipients 40, such as recipient 40N. A DoS attack might also obstruct or overload the communication channel between the intermediary 30N and the intended recipient 40N.

Consider now the situation where a DoS attack has occurred. In a DoS attack, a significant number of compromised computer systems 60 may send repeated requests over one or more communication channels 62 to, for example, the intermediary 30N. The intermediary 30N may be unable to process the multitude of requests and, as a result, is essentially off-line. A client device 15 requests work and, in response thereto, the originator 20 may send a work assignment to an intermediary 30, 30N for example. Because the intermediary 30N is under a DoS attack, however, the intermediary 30N may either not be able to process the request or may process the request extremely slowly. The DoS attack is therefore due to overload of the intermediary 30N. Thus, the intermediary 30N may not be able to send the work assignment to the recipient 40N, or to report the results to or pass any data to the originator 20. The originator 20, therefore, has no knowledge of why there is no result from the work assignment that it sent, or whether the problem lies with the intermediary 30N or the recipient 40N.

A different type of DoS attack could also occur in cases where the intermediary 30N fails to send the requests to the recipient 40N, but still indicates to the originator 20 that it is indeed doing so. This may occur through malfunction or maliciousness, such as may be caused by a virus or other malware or by the person operating the intermediary 30N. The DoS attack is therefore due to inaction of the intermediary 30N.

Consequently, in view of the above, it should be appreciated that MITM and DoS attacks are often hard to detect, especially if the result expected back from a request does not need to contain proof of work, or the work expected will take a substantial amount of time to perform. Such attacks can go undetected for substantial periods of time and, even once suspected, it may be difficult to quickly identify the nature or location of the problem.

Consider now the operation of the system 10 shown in FIG. 1 with the addition of a work assignment logger 65 (which may be referred to as the "logger"). The work assignment logger 65 performs as a storage device to maintain records of the reported work assignments. The work assignment logger 65 might also perform other functions if desired. Each recipient 40 reports each received work assignment to the work assignment logger 65 over a communication channel 80. The work assignment logger 65 then creates a work assignment report (which might be referred to herein as a "service report"), and sends the work assignment report to the originator 20 over a communication channel 85 in response to a request from the originator 20.

For convenience of illustration, only one work assignment logger 65, communication channel 80, and communication channel 85 are shown. In practice, however, there may be numerous work assignment loggers 65 with each logger 65 communicating with a number of associated recipients 40, there may be numerous communication channels 80 for communications between the logger 65 or each logger 65 and its associated recipients 40, and there may be numerous communication channels 85 for communications between the logger 65 or each logger 65 and the originator 20.

In another implementation, each recipient 40 may report to two or more loggers 65 via different communication channels 80 and the work assignment reports from the different loggers 65 may be compared to each other and/or to the work assignment originally sent by the originator 20. Thus, an attack on a logger 65 can be detected and the information may be used to determine the location of the attack.

MITM attacks can be at different levels, and have different effects. For example, an example, an MITM attack on an intermediary 30 (a high-level attack) may allow all communications to/from that intermediary to be controlled by the attacker. In order to effectively conceal the attack, however, most or all of the recipients 40 associated with that intermediary 30, or most or all of the independent communication channels 80 from the recipients 40 would have to be identified and targeted by that same attacker as well. This would be a difficult task or even an impossible task because of the resources that the attacker would need if the intermediary 30 has hundreds or thousands of recipients. Thus, in this scenario, the effects of the MITM attack may be widespread as the attacker may be able to attack and control communications going to numerous recipients, but the damage will be limited as the likelihood of such an attack being non-detectable is substantially reduced. For example, the damage may be limited to the time that it takes for the originator 20 to compare sent and reported work assignments and identify the compromised intermediary 30.

As another example, consider an MITM attack on a recipient 40 (a low-level attack). The MITM may take control of, for example, the recipient's computer, or the NIC in the recipient's computer. The MITM attacker may therefore be able to intercept and control both the incoming communication from the intermediary 30 and the outgoing communication to the logger 65 on the independent communication channel 80. The scope of an attack at this level is also limited because of the resources that the attacker would need in order to control numerous recipients 40. Thus, in this scenario, the effects of the MITM attack are focused and limited to a few recipients so the damage will be limited even though the MITM attack may not be detectable. For example, the damage may be limited to the few recipients over which the attacker has the resources available to exert complete control.

The operation of the originator 20 may be controlled by one or more applications or modules. There may be, by way of example and not of limitation, a work assignment module that controls, for example, the receipt of work assignments from client devices 15 and assigns and distributes the various work assignments to the various intermediaries 30 and/or recipients 40; a work analysis module that analyzes the work assignment reported to have been received by the recipient 40 in view of work assignments sent by, for example, the originator 20; a record and report module that records the results of the analysis and may report the results, especially any errors, to an appropriate person, department, or other program; and/or an assignment information module that stores and retrieves information regarding the various work assignments that have been sent, information regarding the work assignments reported as received by the recipients, the assignment and distribution of the work assignments, work results, comparisons and analyses, identification information regarding compromised or disabled intermediaries, recipients, communication channels, loggers, and/or other data stored, read, and/or executed by the originator 20.

The originator 20 may request the work assignment report at a predetermined time interval after it sends a work assignment, such as 0.1 seconds, 1 second, 10 seconds, etc., may request the work assignment report at predetermined times, may request the work assignment report at predetermined time intervals, such as every minute, every 10 minutes, every hour, etc., or based upon some other event, such as receiving information back from a recipient 40 that was not requested or is not responsive to the work assignment. In addition, or alternatively, the work assignment logger 65 can send a work assignment report to the originator 20 automatically in accordance with predetermined criteria, such as, but not limited to, in response to a work assignment being reported by a recipient 40, at periodic intervals, every time a certain number of work assignments have been reported by recipients 40, at predetermined times, etc.

Each of the recipients 40 reports its received work assignments to the work assignment logger 65 via a different (independent) communication channel or channels 80 than the communication channels 75, 76 over which work assignments are transmitted from the originator 20 to the intermediaries 30, or from the intermediaries 30 to the recipients 40.

Preferably, but not necessarily, each recipient 40 reports the work assignment to the logger 65 as soon as the recipient 40 receives the work assignment.

The logger 65 then forwards the reported work assignments to the originator 20. The logger 65 may forward the work assignments individually, in groups, as summaries, automatically, on request by the originator 20, etc. The originator 20 then analyzes the information in the work assignment report received from the work assignment logger 65 in view of the work assignment that it previously sent to an intermediary 30. If work assignments are repeatedly not being reported to the work assignment logger 65, or if a large number of work assignments are not being reported to the work assignment logger 65, then an error, such as a DoS attack, has likely occurred. Similarly, if the work assignment reported by the logger 65 does not correspond to the work assignment sent by the originator 20, then an error, such as an MITM attack, might have occurred. Different sent and received work assignments, and missing work assignments, are therefore considered to be errors.

Thus, briefly stated, the originator 20 sends work assignments to the intermediaries 30. Each intermediary 30 allocates its work assignments among its respective recipients 40 and sends the work assignments to the recipients 40. Each recipient 40 reports the work assignment that it has received to the logger 65. The logger 65 sends a work assignment report containing information on the work assignments that it received from the various recipients. The work assignment report is analyzed in view of the work assignments that the originator 20 sent to the intermediaries 30 to determine any errors. Any errors can then be acted on and/or reported for action.

On the Internet (and with respect to switched networks in general), a communication route from a first (starting) system to a second (destination) system is created and/or determined when a need is first identified to communicate between the two systems. The systems may range in size from, for example, a personal computer to a server or host. The communication route includes any devices or systems which are used to transfer data along the route. A communication route, once determined, may or may not be cached and/or used repeatedly for a period of time. If communication route is identified from the first system to the second system for communications from the first system to the second system, and the second system chooses to use the same communication route for communications from the second system back to the first system, then the communication routes are not independent, and it may be somewhat easy to conceal an MITM attack at any point in the communication route. If, however, the first communication route does not include any devices or systems which are used in the second communication route, then the communication routes are independent, and it will be more difficult to conceal an MITM attack. If the first communication route and second communication route have one or more devices or systems in common but not all devices or systems in common, then the communication routes are somewhat, but not completely, independent, and the difficulty of concealing an MITM attack will depend on whether the attack is at a common device or system.

In many cases, simply having a separate destination may result in an independent communication channel. For example, with respect to the originator 20, designating the logger 65 as a destination for one communication and an intermediary 30 or recipient 40 for another communication may result in independent communication channels. Similarly, the originator 20 designating an intermediary 30 or a recipient 40 for one communication, and the logger 65 designating the originator 20 for another communication, may also result in independent communication channels.

Also, if a device has two or more NICs, then using one NIC for communication with one device and using another NIC for communication with another device may result in independent channels. For example, an intermediary 30 may use a first NIC for communication with the originator 20, and may use a second NIC for communication with recipients 40, or a use a first NIC for communication with the originator 20, a second NIC for communication with a first recipient 40 or a first group of recipients 40, a third NIC for communication with a second recipient 40 or a second group of recipients 40, etc. The originator 20 and each recipient 40 may similarly have two or more NICs.

Further, a device 20, 30, 40, 65 may maintain a record of current communication channels, compare a proposed new communication channel with the current communication channels, reject the proposed new communication channel and/or request or propose a different communication channel if the communication channels have any, or too many, common points.

Even if the communication channels 80, 85 with respect to the logger 65 are not completely independent of the communication channels 75, 76 used between the other devices 20, 30, 40, the less the communication channels 80, 85 have in common with the communication channels 75, 76 then the more difficult the work becomes to conceal an MITM attack. Importantly, the type of work needed to conceal an MITM attack is a different type of work than that needed to conceal a DoS attack and may not result in the desired attack. For example, in one type of DoS attack, modifying the log data of the affected device might be equivalent to having performed the work, thus rendering the DoS attack ineffective.

Also, different transport layers could be used between the originator 20 and logger 65, and/or logger 65 and one or more recipients 40 can result in independent communication channels.

Thus, the use of communication channels which are partially or completely independent increases the likelihood of detection of MITM and DoS attacks.

Consider first the scenario described above wherein an MITM attacker 50 has interposed itself between the intermediary 30C and the recipient 40C. In this case the MITM attacker 50 may intercept work assignments transmitted from the intermediate 30C to the recipient 40C. The MITM attacker 50 may then alter the work assignment and transmit the altered (modified) work assignment to the recipient 40C.

The recipient 40C then transmits the (altered) work assignment that it received to the work assignment logger 65. The logger 65 generates a work assignment report which contains information regarding the work assignment received from the recipient 40. The logger 65 sends the work assignment report to the originator 20. The originator 20 then compares the information in the work assignment report received from the work assignment logger 65 to the work assignments that it sent to the intermediary 30C. Because the work assignment received by the recipient had been altered, the work assignment sent by the recipient to the logger will be different from the work assignment sent by the originator so an error, most likely an MITM attack, has occurred. If many of the recipients 40 assigned to the intermediary 30C report work assignments that are determined to have been altered, then the MITM attacker 50 is probably located between the originator 20 and the intermediary 30C, or the intermediary 30C itself may have become compromised. If the work assignments that are determined to be altered come from a single recipient 40 or a few recipients 40 then the MITM attacker 50 is likely between the intermediary 30 and the recipient 40C, or the recipient 40C itself may have become compromised.

Consider now the case of a DoS attack. In this scenario, the recipients 40 may not receive work assignments transmitted by the originator due to the DoS attack. Thus, when the originator 20 inspects the work assignment report received from the logger 65, the originator 20 will detect that one or more work assignments have not been reported by a recipient or recipients 40 to the logger 65. This may be an indication of a DoS attack, or may just be slowness due to the volume of work or the complexity of the work. Optionally, the originator 20 may inspect subsequent reports from the logger 65 for the presence of the missing work assignment, and/or the originator 20 may send the work assignment again and monitor the reports from the work assignment logger 65 for reporting of the missing work assignment. If work assignments are repeatedly missing, then an error, such as a DoS attack, has likely occurred and/or is still occurring. If many of the recipients 40 assigned to the intermediary 30N do not report work assignments then the DoS attack is likely at the intermediary 30N level. If the work assignments that are determined not to have been received come from a single recipient 40 or a few recipients 40 then the DoS attack is probably at the recipient 40 level, or in one or more communication channels between the intermediary 30N and its recipients.

The technique described above may also be used to determine if the work assignment logger 65, or its associated communication channels 80, 85, have become compromised. If few, very few, or none of the work assignments reported by the work assignment logger 65 match the work assignments sent by the originator 20, or if an unacceptably large number of work assignments sent by the originator 20 are not being reported by the work assignment logger 65, then it is likely that the work assignment logger 65 and/or its associated communication channels 80, 85 have become compromised.

If the originator 20 determines that an intermediary 30, a recipient 40, the work assignment logger 65, or a communication channel has been compromised, then the originator 20 records an indication that a compromise may have occurred, may stop sending work assignments to that intermediary 30, may instruct an intermediary 30 not to send work assignments to one or more particular recipients 40, and/or may report the likely compromise of the intermediary, recipient, logger, or communication channel to a person, department, or error reporting program for corrective action. The indication may be simple, such as simply setting a bit to indicate a work assignment error, which could mean that the work assignment sent by the originator 20 has not been reported by the work assignment logger 65, or that the work assignment sent by the originator 20 does not match the work assignment reported by the work assignment logger 65. The indication might also be more complex, such as including the actual work assignment sent, the actual work assignment reported, time and date information, error-alteration detection information (such as but not limited to checksums, hash values, cryptographic hash values, or electronic signatures), communication channels used, intermediaries used, information returned in response to the work assignment, etc.

In an alternative implementation, the originator 20 may send work assignments to intermediaries 30 and also send them to the work assignment logger 65, the work assignment logger 65 analyzes the received work assignments from the recipients 40 in view of the work assignments from the originator 20, and then reports to the originator 20 any differences and/or failures to report to the originator 20 or to a person, department, or error reporting program for corrective action. If the logger 65 reports the errors to the originator 20, then the originator 20 may take action as discussed above.

Figure 2:
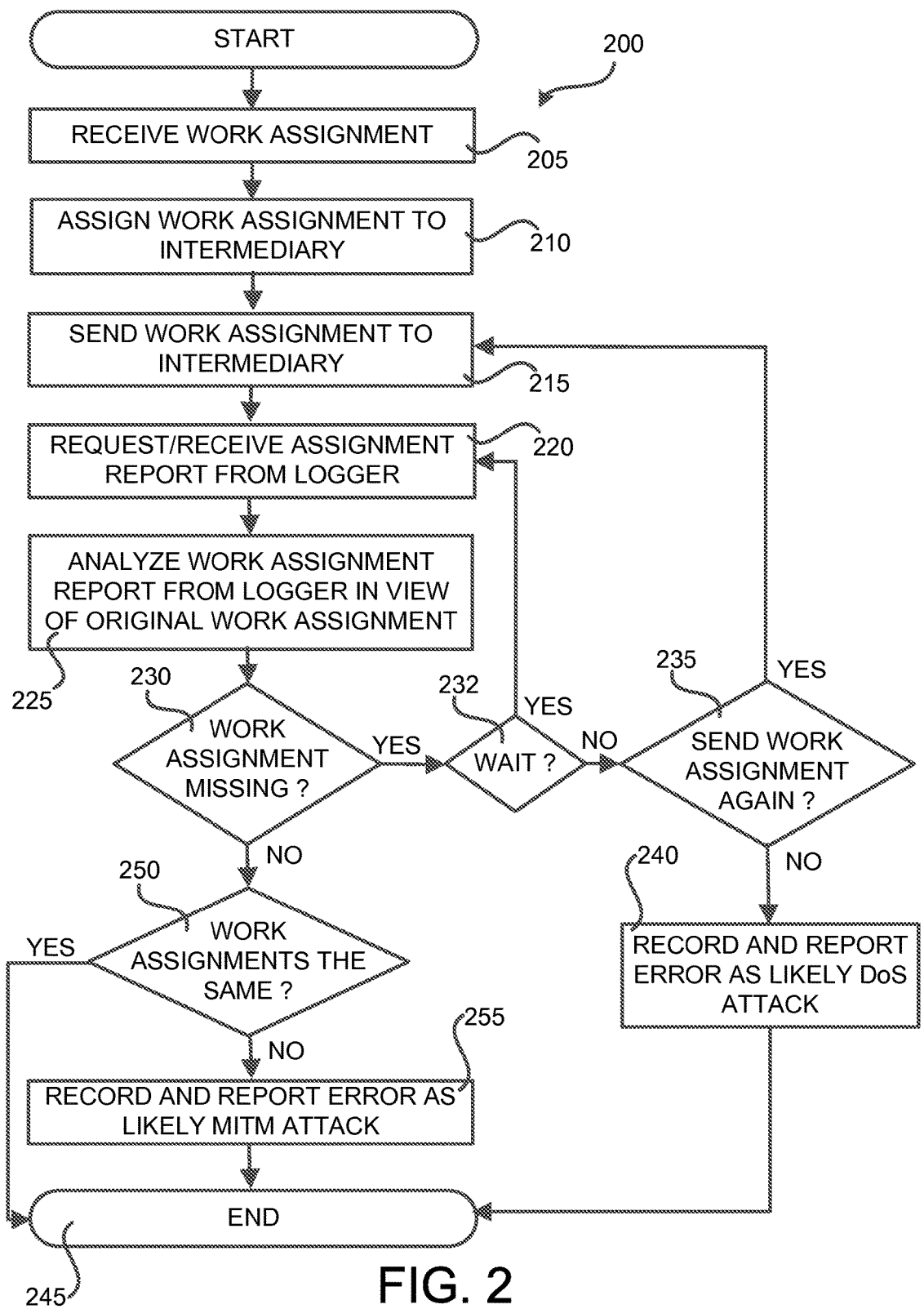
FIG. 2 is a flowchart showing an illustrative routine performed by a work originator to detect attacks, such as MITM and DoS attacks, according to one embodiment disclosed herein.

FIG. 2 is a flow diagram showing a routine 200 that illustrates additional aspects of the mechanism shown in FIG. 1 for detecting attacks, such as MITM and DoS attacks. It should be appreciated that the logical operations described herein with respect to FIG. 2 and the other figures are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 200 begins at operation 205, where the originator 20 receives a work assignment from a client device 15. The routine 200 then proceeds to operation 210, where the work assignment is assigned to an intermediary 30. At operation 215, the work assignment is transmitted to an intermediary 30. From operation 215, the routine 200 proceeds to operation 220.

At operation 220, the work assignment report is requested and received from the work assignment logger 65 or, as mentioned above, the work assignment logger 65 may send the report according to its own programming instructions. The routine 200 then proceeds to operation 225, where the work assignment in the work assignment report received from the work assignment logger 65 is analyzed in view of the original work assignment sent by the originator 20. The routine 200 then proceeds from operation 225 to operation 230.

If, at operation 230, the work assignment is missing from the report, then the routine 200 proceeds to operation 232, where a determination is made as to whether to wait for a period of time to pass and request/receive the report again. If it is determined at operation 232 to wait, then the routine 200 proceeds back to operation 220. If a determination is made not to wait, then a determination is made at operation 235 as to whether to send the work assignment again.

If, at operation 235, it is determined that the work assignment is to be sent again, then the routine 200 proceeds back to operation 215. If the determination is not to send the work assignment again, such as because the work assignment has already been sent more than once, or too much time has elapsed, then the error, that is, the missing work assignment, then the routine 200 proceeds to operation 240, where an indication is recorded that a compromise may have occurred, and may be reported as a likely DoS attack. Other operations might also be performed in response to identifying a probable DoS attack. The routine 200 then proceeds from operation 240 to operation 245 where it ends, at least with respect to that particular work assignment.

If, at operation 230, the work assignment is present in the report, then the routine 200 proceeds to operation 250, where a determination is made as to whether the work assignment that was sent is the same as the work assignment reported by the work assignment logger 65. If the work assignments are the same then the routine 200 proceeds to operation 245, where it ends, at least with respect to that work assignment. If the work assignments are different then an indication is recorded at operation 255 that a compromise may have occurred, and may be reported as a likely MITM attack. Other actions might also be taken in response to detecting a potential MITM attack. From operation 255, the routine 200 proceeds to operation 245 where it ends, at least with respect to that work assignment.

It should be appreciated that the analysis of the reported work assignments in view of the sent work assignments, or vice versa, may be made in any convenient and reliable manner. For example, the analysis may be performed using a character-by-character comparison, by analyzing the error-alteration detection information, such as but not limited to, by generating and/or comparing checksums, hash values, cryptographic hash values, electronic signatures, etc., by comparing a summary log of sent work assignments with a summary log of reported work assignments, other techniques, or combinations thereof.

If an error is repeatedly occurring for a same recipient 40, but not all recipients 40 of a particular intermediary 30, then it is likely that the problem is with the recipient 40 or a communication channel between that recipient 40 and that particular intermediary 30. If, however, errors are occurring for many, most, or all of the recipients 40 of a particular intermediary 30, then it is likely that the problem is with that particular intermediary 30 or a communication channel between the originator 20 and that particular intermediary 30.

The procedure described above with regard to FIG. 2 is preferably performed by the organizer 20, but parts of the procedure could, if desired, by performed by one or more other entities. For example, as mentioned herein, the organizer 20 could send the work assignment to both the selected intermediary 30 and to the work assignment logger 65. In that event, the work assignment logger 65 could perform operations 230, 232, 240, 250, and/or 255 to determine whether work assignments are missing, determine whether work assignments should be sent again, instruct the organizer 20 to send them again, perform analyses of the work assignments reported by the recipients 40 in view of the work assignments sent by the originator 20, and/or report errors, such as likely DoS and MITM attacks.

It will be appreciated that the recipient 40 merely reporting the work assignment it has received back to the originator 20 through the same communication channel(s) and intermediary 30 that it received the work assignment from is possible, but is not as reliable, because the MITM attack 50 attempts to conceal its presence and efforts, and because there may not be a report back if a DoS attack is present. Therefore, the use of a logger 65 and independent communication channels 80, 85 are preferred.

In an alternative implementation, a recipient 40 may report the received work assignment via an independent communication channel 80 to a different intermediary 30 than the one from which it received the work assignment. In this implementation, the other intermediary 30 functions as a logger 65 for recipients other than its own recipients. For example, intermediary 30A may perform as a logger 65 for the recipients 40C and 40N, and report to the originator 20 via communication channel 75A, which is independent of communication channels 75N and 76 used to convey the work assignment to the recipient 40N.

In another alternative implementation, there may be a multitude of loggers 65, and each logger may be dedicated to certain recipients, or each logger may receive information from most or all of the recipients. This provides redundancy and problem identification in the event that a logger 65 and/or its associated independent communication channels become compromised and/or fail.

Thus, the use of one or more independent reporting channels, such as communication channels 80, 85, storage of the reported work assignment, such as, but not limited to, by work assignment logger 65, and analysis of the reported work assignments in view of the originally-sent work assignments by, for example, but not limited to, an originator 20, can provide for detection of both MITM and DoS attacks. The use of one or more independent reporting channels, storage of the reported work assignment, and analysis of the reported work assignments in view of the original work assignments, also provides for identification of whether an error is likely at the intermediary level or the recipient level. Such MITM and DoS attacks may therefore be detected, even if the result expected back does not need to contain proof of work, or the work expected will take a substantial amount of time to perform. The source of the problem may also be identified, even if the result expected back does not need to contain proof of work, or the work expected will take a substantial amount of time to perform.

The above procedure might also be implemented at the intermediary 30 level, either in addition to or instead of, at the originator 20 level. For example, an intermediary 30 may have its own associated work assignment logger 65, the recipient 40 reports the work assignment to that associated work assignment logger 65 via an independent channel, and the intermediary 30 analyzes the work assignment reported via the associated logger 65 in view of the work assignment it sent to the recipient 40.

If the intermediary 30 determines that a recipient 40 or a communication channel 76 has been compromised then the intermediary 30 may stop sending work assignments to that recipient 40 or over that communication channel 76. The intermediary 30 may also report any errors to the originator 20, and/or to a person, department, or error reporting program for corrective action.

This intermediary 30 analysis and reporting procedure might also be used where there are several levels of intermediaries. For example, if an intermediary 30 determines that a downstream intermediary has been compromised then that intermediary may stop sending work assignments to that downstream intermediary. That intermediary 30 might also report any errors to the originator 20, an upstream intermediary, and/or to a person, department, or error reporting program for corrective action. Although the discussion above has been with respect to MITM and DoS attacks, the techniques described herein might also be useful in detecting other types of attacks where the operation of computing components in a distributed computing system have been compromised.

Figure 3:
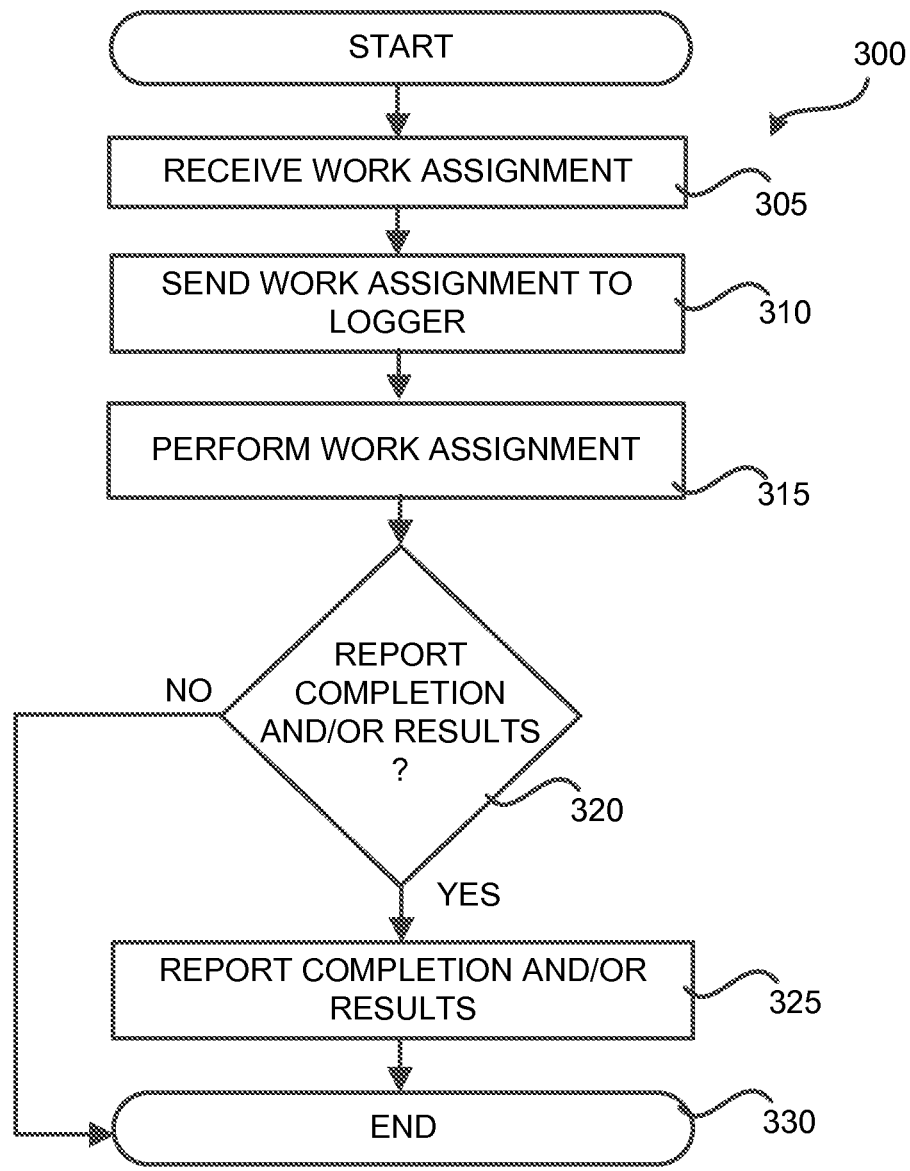
FIG. 3 is a flowchart showing an illustrative routine performed by a work assignment recipient, according to one embodiment disclosed herein.

FIG. 3 is a diagram showing an illustrative routine 300 performed by a work assignment recipient 40, according to one embodiment disclosed herein. The routine 300 begins at operation 305, where the recipient 40 receives a work assignment from an intermediary 30. The routine 300 then proceeds to operation 310, where the recipient sends the work assignment, or at least some information regarding the work assignment, to the logger 65. The information may be, by way of example and not of limitation, an identification of the work assignment and error-alteration detection information for the work assignment. The routine 300 then continues to operation 315, where the recipient then performs the work assignment, which may include reporting results of the work assignment, if appropriate in view of the work being performed. Decision 320 determines whether completion of the work assignment and/or the results of the work assignment are to be reported. If so, then the completion of the work assignment, and/or the results of the work assignment, is reported 325. The routine then ends at operation 330. If neither completion of the work assignment nor the results of the work assignment are to be reported then the routine ends at operation 330.

Figure 4:
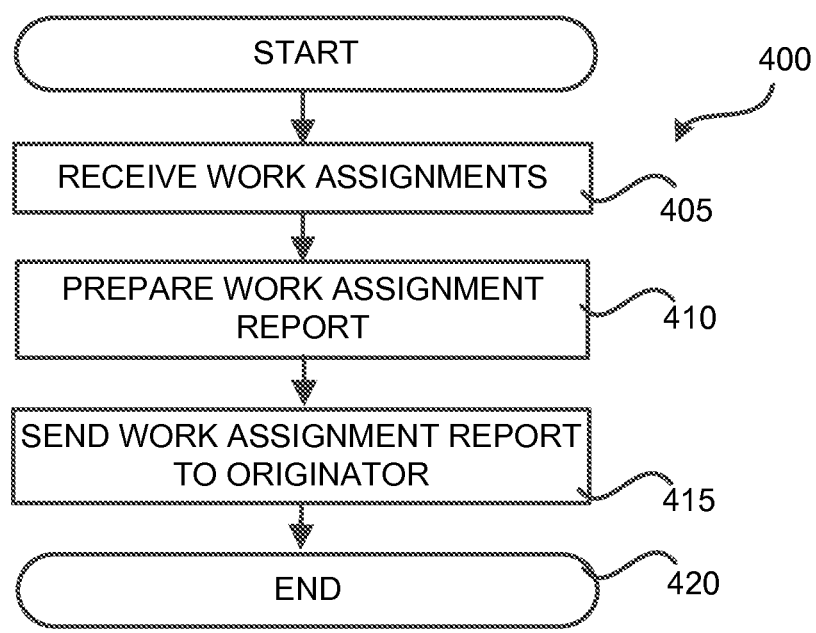
FIG. 4 is a flowchart showing an illustrative routine performed by a work assignment logger, according to one embodiment disclosed herein.

FIG. 4 is a flow diagram showing an illustrative routine 400 performed by a work assignment logger 65, according to one embodiment disclosed herein. The routine 400 begins at operation 405, where the logger receives a work assignment, or at least some information regarding the work assignment, from a recipient 40. The routine 400 then proceeds to operation 410, where the logger prepares a work assignment report based on the information contained in one or more work assignments received from one or more recipients 40. The routine 400 then proceeds to operation 415, where the logger then sends the work assignment report to the originator or another device for action. The logger may send the work assignment automatically or in response to a request, such as a request from the originator. The routine then ends at operation 420.

Figure 5:
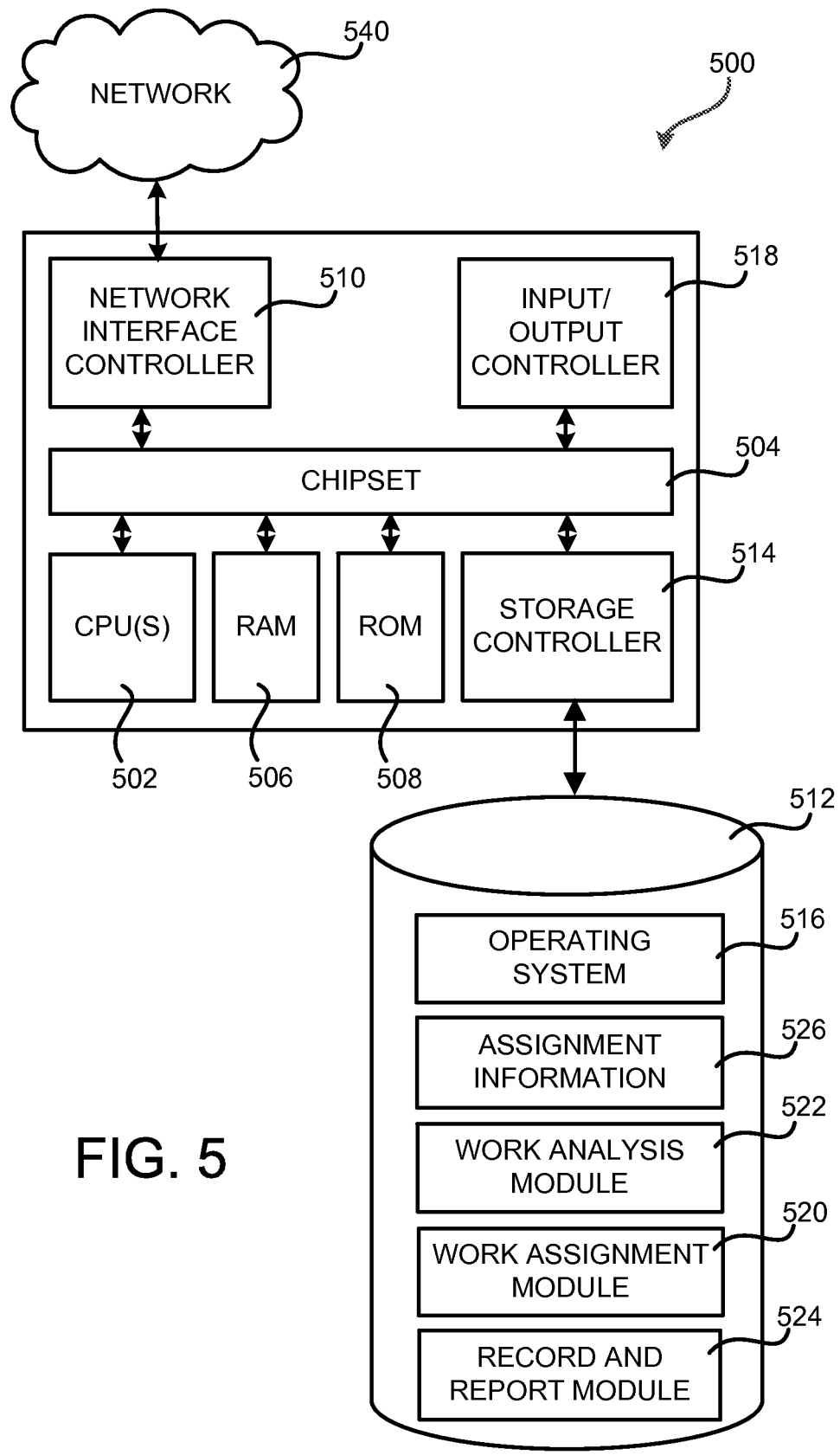
FIG. 5 is a computer architecture diagram showing one exemplary computer architecture for a computing system capable of performing the functionality disclosed herein for detecting MITM and/or DoS attacks.

FIG. 5 shows exemplary computer architecture for a computer 500 capable of providing some or all of the functionality described herein. The computer architecture shown illustrates a conventional server computer, workstation, desktop computer, laptop, network appliance, or other computing device, and may be utilized to execute any aspects of the software components presented herein described as executing within the computing device and/or other computing devices mentioned herein.

The computer 500 includes a baseboard, or "motherboard," which is a printed circuit board to which a multitude of components or devices may be connected by way of a system bus or other electrical communication paths. In one illustrative embodiment, one or more central processing units ("CPUs") 502 operate in conjunction with a chipset 504. The CPUs 502 are standard programmable processors that perform arithmetic and logical operations necessary for the operation of the computer 500.

The CPUs 502 perform the necessary operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 504 provides an interface between the CPUs 502 and the remainder of the components and devices on the baseboard. The chipset 504 may provide an interface to a random access memory ("RAM") 506, used as the main memory in the computer 500. The chipset 504 may further provide an interface to a computer-readable storage medium such as a read-only memory ("ROM") 508 or non-volatile RAM ("NVRAM") for storing basic routines that that help to startup the computer 500 and to transfer information between the various components and devices. The ROM 508 or NVRAM may also store other software components necessary for the operation of the computer 500 in accordance with the embodiments described herein.

The computer 500 may operate in a networked environment using logical connections to remote computing devices and computer systems through the network 540. The chipset 504 may include functionality for providing network connectivity through a network interface controller ("NIC") 510, such as a gigabit Ethernet adapter. The NIC 510 is capable of connecting the computer 500 to other computing devices over the network 540. It should be appreciated that multiple NICs 510 may be present in the computer 500, connecting the computer to multiple communication channels, such as but not limited to communication channels 17, 75, 76, 80, 85, in the network 540, other types of networks, and remote computer systems.

The computer 500 may be connected to a mass storage device 512 that provides non-volatile storage for the computer. The mass storage device 512 may store system programs, application programs, other program modules and data, which have been described in greater detail herein. The mass storage device 512 may be connected to the computer 500 through a storage controller 514 connected to the chipset 504. The mass storage device 512 may consist of one or more physical storage units. The storage controller 514 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 may store data on the mass storage device 512 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 512 is characterized as primary or secondary storage and the like.

For example, the computer 500 may store information to the mass storage device 512 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 may further read information from the mass storage device 512 by detecting the physical states or characteristics of one or more particular locations within the physical storage units.

In addition to the mass storage device 512 described above, the computer 500 may have access to other computer-readable storage medium to store and retrieve information, such as program modules, data structures, or other data. It should be appreciated by those skilled in the art that computer-readable storage media can be any available media that provides for the storage of non-transitory data and that may be accessed by the computer 500.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 512 may store an operating system 516 utilized to control the operation of the computer 500. According to one embodiment, the operating system includes a member of the LINUX family of operating systems. According to another embodiment, the operating system includes a member of the WINDOWS® SERVER family of operating systems from MICROSOFT Corporation in Redmond, Wash. According to further embodiments, the operating system may include a member of the UNIX or SOLARIS families of operating systems. It should be appreciated that other operating systems may also be utilized. The mass storage device 512 may store other system or application programs, modules, and/or data utilized by the computer 500 such as: a work assignment module 520 that controls, for example, the receipt of work assignments from client devices 15 and assigns and distributes the various work assignments to the various intermediaries 30 and/or recipients 40; a work analysis module 522 that analyzes the work assignment reported to have been received by the recipient 40 in view of the work assignments sent by, for example, the originator 20; a record and report module 524 that records the results of the analysis and may report the results, especially any errors, to an appropriate person, department, or other program; and/or an assignment information module 526 that stores and retrieves information regarding the various work assignments that have been sent, information regarding the work assignments reported as received by the recipients, the assignment and distribution of the work assignments, work results, comparisons, analyses, identification information regarding compromised or disabled intermediaries, recipients, communication channels, loggers, and/or other data stored, read, and/or executed by the computing device 500, etc.

In one embodiment, the mass storage device 512 or other computer-readable storage media is encoded with computer-executable instructions that, when loaded into the computer 500, transform the computer from a general-purpose computing system into a special-purpose computer capable of implementing the embodiments described herein. These computer-executable instructions transform the computer 500 by specifying how the CPUs 502 transition between states, as described above. According to one embodiment, the computer 500 has access to computer-readable storage media storing computer-executable instructions which, when executed by the computer 500, perform aspects of one or more of the methods or procedures described herein.

The computer 500 may also include an input/output controller 518 for receiving and processing input from a number of input devices, such as a keyboard, a mouse, a touchpad, a touch screen, an electronic stylus, or other type of input device. Similarly, the input/output controller 518 may provide output to a display, such as a computer monitor, a flat-panel display, a digital projector, a printer, a plotter, or other type of output device. It will be appreciated that the computer 500 may not include all of the components shown herein, may include other components that are not explicitly shown herein, or may utilize an architecture completely different than that shown herein.

Although the exemplary computer architecture shown and discussed herein is directed to the originator 20, this general architecture is also suited for the intermediaries 30, the recipients 40, and the work assignment logger 65, the primary difference being the use of different modules or programs in the mass storage device 512 so as to provide for performance of the functions of the intermediary 30, the recipient 40, or the work assignment logger 65.

Based on the foregoing, it should be appreciated that technologies for identifying attacks, such as but not limited to MITM and DoS attacks, and for identifying devices and/or components subjected to such attacks, have been presented herein. Although the subject matter presented herein has been described in language specific to computer structural features, methodological acts, transformative acts, specific computing machinery, and computer readable media, it is to be understood that the appended claims are not necessarily limited to the specific features, acts, or media described herein. Rather, the specific features, acts and mediums are disclosed as exemplary forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the exemplary embodiments and applications illustrated and described, and without departing from the true spirit and scope of the present invention, which is set forth in the following claims.

What is claimed is:

1. A distributed computing system to determine whether errors have occurred with respect to work to be performed by the system, the distributed computing system comprising:
    an originator stored in memory that when executed by one or more processors of the distributed computing system causes the distributed computing system to:
        receive a plurality of work assignments from a plurality of external devices, and to assign and send a respective work assignment of the plurality of work assignments to a respective intermediary of a plurality of intermediaries, each of the plurality of intermediaries being functionally connected to the originator and each of the plurality intermediaries stored in memory and when executed by the one or more processors of the distributed computing system, cause the distributed computing system to:
            receive a respective work assignment from the originator through a respective first communication channel and
            forward the respective work assignment;
    a plurality of recipients, some of the plurality of recipients being functionally connected to a first intermediary of the plurality of intermediaries, and other of the plurality of recipients being functionally connected to a second intermediary of the plurality of intermediaries, each of the plurality of recipients stored in memory and when executed by the one or more processors of the distributed computing system, cause the distributed computing system to:
        receive a forwarded work assignment from its associated intermediary through a respective second communication channel,
        send a received work report based at least in part on the forwarded work assignment
        the received work report comprising at least one of reporting receipt of the forwarded work assignment or reporting completion of the forwarded work assignment, and
        to execute the forwarded work assignment; and
    an assignment logger, functionally connected to the plurality of recipients and to the originator through one or more communication channels other than the respective first communication channels or the respective second communication channels, the assignment logger stored in memory and when executed by the one or more processors of the distributed computing system cause the distributed computing system to:
        receive the received work reports from the plurality of recipients,
        generate a work assignment report based on the received work reports, and
        to send the work assignment report to the originator,
    wherein the originator, when executed by one or more processors of the distributed computing system, receives the work assignment report from the assignment logger, analyzes information in the work assignment report in view of the plurality of work assignments sent by the originator to determine whether an error occurred with respect to the plurality of work assignments sent by the originator, and records an indication upon determining that an error occurred for the plurality of work assignments determined to have an error.

2. The distributed computing system of claim 1 wherein the originator, when executed by the one or more processors of the distributed computing system, requests the work assignment report from the assignment logger.

3. The distributed computing system of claim 1 wherein the assignment logger, when executed by the one or more processors of the distributed computing system, periodically sends the work assignment report to the originator.

4. The distributed computing system of claim 1 wherein:
    each of the plurality of work assignments comprises error-alteration detection information, the error-alteration detection information being at least one of a checksum, a hash value, a cryptographic hash value, or an electronic signature.

5. The distributed computing system of claim 1 wherein, if the work assignment report does not comprise information regarding one of the plurality of work assignments sent by the originator then the originator determines that the one of the plurality of work assignments was not received by one of the plurality of recipients.

6. The distributed computing system of claim 1 wherein, if the work assignment report comprises information regarding a work assignment sent by the originator but the information does not correspond to the sent work assignment then the originator determines that the sent work assignment was altered prior to receipt thereof by the recipient.

7. The distributed computing system of claim 1 further comprising:
    a plurality of assignment loggers stored in memory, wherein each assignment logger of the plurality of assignment loggers is functionally connected to an associated one or more of the plurality of recipients.

8. A computer-implemented method for a distributed computing system to identify an attack on the distributed computing system, comprising:

receiving, by an originator, a plurality of service requests from a plurality of external devices;

assigning, by the originator, a first of the plurality of service requests to a first transfer device of a plurality of transfer devices;

assigning, by the originator, a second of the plurality of service requests to a second transfer device of the plurality of transfer devices, wherein the first of the plurality of service requests differs from the second of the plurality of service requests;

sending, by the originator, the first of the plurality of service requests to the first transfer device via a first communication channel, the first of the plurality of service requests being sent to the first transfer device for transfer to a first plurality of execution devices for execution;

sending the second of the plurality of service requests to the second transfer device via a second communication channel, the second of the plurality of service requests being sent to the second transfer device for transfer to a second plurality of execution devices for execution;

sending, by the first transfer device, each of the first of the plurality of service requests to respective first execution devices of a plurality of execution devices;

sending, by the second transfer device, each the second of the plurality of service requests to respective second execution devices of the plurality of execution devices, wherein each of the plurality of execution devices:
  sends a received work report to a storage system, the received work report comprising information regarding receipt of a respective service request of the plurality of service requests, and
  executes the respective service request;

receiving, by the originator, a service report via a third communication channel from the storage system, the service report including information regarding each of the received work reports sent by the plurality of execution devices;

analyzing, by the originator, the service report in view of the plurality of service requests to determine whether an error occurred; and recording, by the originator, an indication if an error occurred, wherein the first communication channel, the second communication channel and the third communication channel differ.

9. The computer-implemented method of claim 8 and further comprising, prior to receiving the service report, the originator requesting the service report from the storage system.

10. The computer-implemented method of claim 8 wherein, if the service report does not indicate receipt of the respective service request by at least one of the plurality of execution devices, then the originator recording an indication that the respective service request was not reported as having been received by the at least one of the plurality of execution devices.

11. The computer-implemented method of claim 8 wherein, if a service request of the plurality of service requests does not correspond to the service report, then the originator recording an indication that the service request was altered prior to receipt thereof by the execution device of the plurality of execution devices for which the service request is the respective service request.

12. The computer-implemented method of claim 8 wherein:

each of the plurality of service requests comprises error-alteration detection information, the error-alteration detection information being at least one of a checksum, a hash value, a cryptographic hash value, or an electronic signature.

13. The computer-implemented method of claim 12 wherein, if the error-alteration detection information of at least one of the plurality of service requests is different from the error-alteration detection information of the service report then the originator recording an indication that the at least one of the plurality of service requests was altered.

14. The computer-implemented method of claim 8 wherein, if the service report does not indicate receipt of at least one of the plurality of service requests by at least one of the plurality of execution devices then, prior to recording an indication of an error:
  sending, by the originator, the at least one of the plurality of service requests again.

15. The computer-implemented method of claim 14 wherein recording an indication comprises the originator recording that the at least one of the plurality of service requests was not received by at least one of the plurality of execution devices.

16. The distributed computing system of claim 2 wherein the assignment logger responds to the request from the originator by sending the work assignment report to the originator.

17. The distributed computing system of claim 4 wherein the error-alteration detection information is forwarded to the assignment logger as at least part of the received work report.

18. The distributed computing system of claim 17 wherein the assignment logger receives the error-alteration detection information and forwards the error-alteration detection information to the originator as at least part of the work assignment report.

19. The distributed computing system of claim 18 wherein the originator analyzes the error-alteration detection information received from the assignment logger in view of the respective work assignment sent each respective intermediary of the plurality of intermediaries.

20. The distributed computing system of claim 7 wherein each of the plurality of assignment loggers is functionally connected to the originator through one or more communication channels other than the respective first communication channels or the respective second communication channels.

21. The distributed computing system of claim 20 wherein each of the plurality of assignment loggers is functionally connected to an associated one or more of the plurality of execution devices through one or more communication channels other than the respective first communication channels or the respective second communication channels.

22. The computer-implemented method of claim 12 wherein the service report comprises error-alteration detection information.

23. The computer-implemented method of claim 22 further comprising analyzing, by the originator, the error-alteration detection information of at least one of the plurality of service requests in view of the error-alteration detection information of the service report to determine whether an error occurred.

24. The computer-implemented method of claim 14 further comprising receiving, by the originator, a subsequent service report.

25. The computer-implemented method of claim 24 further comprising analyzing, by the originator, the subsequent service report in view of the at least one of the plurality of service requests to determine whether an error occurred.

26. The computer-implemented method of claim 25 further comprising recording, by the originator, an indication if an error occurred.

* * * * *